(12) United States Patent
Hoshimure et al.

(10) Patent No.: US 8,093,793 B2
(45) Date of Patent: Jan. 10, 2012

(54) FLUORESCENT LAMP MADE OF GLASS AND HAVING PARTICULAR COMPOSITION

(75) Inventors: Takashi Hoshimure, Oamishirasalo (JP); Tetsuo Asano, Mobara (JP); Hiroki Yamamoto, Hitachi (JP); Takashi Naito, Funabashi (JP)

(73) Assignee: Hitachi Displays, Ltd., Chiba (JP)

( * ) Notice: Subject to any disclaimer, the term of this patent is extended or adjusted under 35 U.S.C. 154(b) by 278 days.

(21) Appl. No.: 12/429,272

(22) Filed: Apr. 24, 2009

(65) Prior Publication Data
US 2009/0267483 A1  Oct. 29, 2009

(30) Foreign Application Priority Data

Apr. 25, 2008 (JP) ................................. 2008-115045

(51) Int. Cl.
*H01J 17/16* (2006.01)
*C03C 3/089* (2006.01)

(52) U.S. Cl. ............ 313/493; 313/634; 501/64; 501/65; 501/66

(58) Field of Classification Search .................. 313/493, 313/623–625, 573; 501/64, 65, 66
See application file for complete search history.

(56) References Cited

FOREIGN PATENT DOCUMENTS

| JP | 05-008861 | 2/1993 |
|---|---|---|
| JP | 3575114 | 7/2004 |
| JP | 3786397 | 3/2006 |
| JP | 2007-210851 | 8/2007 |

*Primary Examiner* — Joseph L Williams
(74) *Attorney, Agent, or Firm* — Antonelli, Terry, Stout & Kraus, LLP.

(57) ABSTRACT

An object of the present invention is to provide fluorescent lamps used as a light source for liquid crystal display devices, which have excellent characteristics in terms of preventing solarization, the properties for blocking ultraviolet rays, and the physical and thermal strength, and preventing scratching. The present invention provides fluorescent lamps made of glass containing 55.0% to 75.0% of $SiO_2$; 10.0% to 25.0% of $B_2O_3$; 1.0% to 10.0% of $Al_2O_3$; 0% to 3.8% of $Na_2O$; 0% to 3.0% of $Li_2O$; 3.0% to 10.0% of $K_2O$; 3.2% to 16.0% of $Na_2O+Li_2O+K_2O$; 0.5% to 8% of $TiO_2$; 0.1% to 5% of $CeO_2$; 0.6% to 8.1% of $TiO_2+CeO_2$; 0.001% to 0.05% of $Fe_2O_3$; 0% to 0.7% of $Sb_2O_3$; 0.1% to 3.0% of $SnO_2$; and 0.5% to 10.0% of at least one rare earth element selected from the group consisting of Gd, Y, La, Yb and Lu by weight, and is characterized in that the coefficient of linear expansion in a temperature range of 30° C. to 380° C. is $34\times10^{-7}/°$ C. to $58\times10^{-7}/°$ C.

18 Claims, 9 Drawing Sheets

FIG. 1

| Sample No. | | 1 | 2 | 3 | 4 | 5 | 6 | 7 | 8 |
|---|---|---|---|---|---|---|---|---|---|
| Glass composition (weight%) | $SiO_2$ | 67 | 54 | 55 | 60 | 75 | 76 | 74 | 74 |
| | $B_2O_3$ | 18 | 24 | 23 | 21 | 12 | 10 | 10 | 9 |
| | $Al_2O_3$ | 3 | 8 | 8 | 5 | 1 | 2 | 3 | 4 |
| | $Na_2O$ | 3 | 3 | 3 | 3 | 3 | 3 | 3 | 3 |
| | $Li_2O$ | 1.5 | 1.5 | 1.5 | 1.5 | 1.5 | 1.5 | 1.5 | 1.5 |
| | $K_2O$ | 4.5 | 4.5 | 4.5 | 4.5 | 4.5 | 4.5 | 4.5 | 4.5 |
| | $Na_2O+Li_2O+K_2O$ | 9 | 9 | 9 | 9 | 9 | 9 | 9 | 9 |
| | $TiO_2$ | | | | | | | | |
| | $CeO_2$ | | | | | | | | |
| | $Fe_2O_3$ | | | | | | | | |
| | $SnO_2$ | | | | | | | | |
| | $Sb_2O_3$ | | | | | | | | |
| | $Gd_2O_3$ | 3 | 5 | 5 | 5 | 5 | 3 | 4 | 4 |
| | $Y_2O_3$ | | | | | | | | |
| | $La_2O_3$ | | | | | | | | |
| | $Yb_2O_3$ | | | | | | | | |
| | $Lu_2O_3$ | | | | | | | | |
| | $Er_2O_3$ | | | | | | | | |
| | | 100 | 100 | 100 | 100 | 100 | 100 | 100 | 100 |
| Solubility of glass, cystallinity, uniformity | | ○ | ○ | ○ | ○ | ○ | × striae | ○ | × striae |
| Coloring | | ○ | ○ | ○ | ○ | ○ | ○ | ○ | ○ |
| Coefficient of linear thermal expansion $(30\sim380°C)\times 10^{-7}/°C$ | | 52.7 | 53.2 | 52.8 | 52.2 | 51 | 51.2 | 50.9 | 51.1 |
| Transmittance for 532nm (thickness:0.5mm) | | 91.1 | 90.5 | 91.2 | 90.2 | 90.3 | 84.2 | 90.1 | 82.2 |
| Transmittance for 313nm (thickness:0.5mm) | | 82.4 | 83 | 83.1 | 82.9 | 82.8 | 75.5 | 83.4 | 74.9 |
| Micro Vickers hardness(HV) | | 615 | 602 | 603 | 604 | 608 | 612 | 611 | 610 |
| Ratio of reduction in weight for testing for waterproofness(%) (90°C, 24hours) | | 0.4 | 1.2 | 0.9 | 0.7 | 0.4 | 0.3 | 0.4 | 0.5 |

FIG. 2

| Sample No. | | 9 | 10 | 11 | 12 | 13 | 14 | 15 | 16 |
|---|---|---|---|---|---|---|---|---|---|
| Glass composition (weight%) | SiO$_2$ | 60 | 59 | 74 | 63 | 63 | 68 | 68 | 68 |
| | B$_2$O$_3$ | 25 | 26 | 12.5 | 14 | 13 | 20 | 20 | 20 |
| | Al$_2$O$_3$ | 2 | 2 | 0.5 | 10 | 11 | 5 | 4.5 | 4.5 |
| | Na$_2$O | 3 | 3 | 3 | 3 | 3 | 0 | 0 | 0.3 |
| | Li$_2$O | 1.5 | 1.5 | 1.5 | 1.5 | 1.5 | 0 | 0 | 0 |
| | K$_2$O | 4.5 | 4.5 | 4.5 | 4.5 | 4.5 | 3 | 3.2 | 3 |
| | Na$_2$O+Li$_2$O+K$_2$O | 9 | 9 | 9 | 9 | 9 | 3 | 3.2 | 3.3 |
| | TiO$_2$ | | | | | | | | |
| | CeO$_2$ | | | | | | | | |
| | Fe$_2$O$_3$ | | | | | | | | |
| | SnO$_2$ | | | | | | | | |
| | Sb$_2$O$_3$ | | | | | | | | |
| | Gd$_2$O$_3$ | 4 | 4 | 4 | 4 | 4 | 4 | 4.3 | 4.2 |
| | Y$_2$O$_3$ | | | | | | | | |
| | La$_2$O$_3$ | | | | | | | | |
| | Yb$_2$O$_3$ | | | | | | | | |
| | Lu$_2$O$_3$ | | | | | | | | |
| | Er$_2$O$_3$ | | | | | | | | |
| | | 100 | 100 | 100 | 100 | 100 | 100 | 100 | 100 |
| Solubility of glass, cystallinity, uniformity | | ○ | × uneven | ○ | ○ | × striae | ○ | ○ | ○ |
| Coloring | | ○ | ○ | ○ | ○ | ○ | ○ | ○ | ○ |
| Coefficient of linear thermal expansion (30~380°C) × 10$^{-7}$/°C | | 52 | 52.1 | 50.6 | 51.8 | 51.6 | 33.2 | 34.2 | 34.5 |
| Transmittance for 532nm (thickness:0.5mm) | | 91 | 82.4 | 90.4 | 91.1 | 81.4 | 91.2 | 90.8 | 90.6 |
| Transmittance for 313nm (thickness:0.5mm) | | 82.7 | 73.6 | 82.5 | 82.2 | 72 | 82.6 | 82.9 | 83.4 |
| Micro Vickers hardness(HV) | | 603 | 601 | 595 | 612 | 621 | 610 | 607 | 606 |
| Ratio of reduction in weight for testing for waterproofness(%) (90°C, 24hours) | | 0.4 | 0.3 | 0.4 | 0.4 | 0.5 | 0.4 | 0.5 | 0.3 |

FIG. 3

| Sample No. | | 17 | 18 | 19 | 20 | 21 | 22 | 23 | 24 |
|---|---|---|---|---|---|---|---|---|---|
| Glass composition (weight%) | $SiO_2$ | 65 | 65 | 64 | 64 | 64 | 64 | 63 | 63 |
| | $B_2O_3$ | 16 | 16 | 15 | 15 | 15 | 15 | 14 | 14 |
| | $Al_2O_3$ | 5 | 4 | 3 | 3 | 3 | 3 | 3 | 2.2 |
| | $Na_2O$ | 0 | 0 | 2 | 1 | 3.8 | 4 | 3 | 3.8 |
| | $Li_2O$ | 0 | 0 | 3 | 4 | 3 | 3 | 3 | 3 |
| | $K_2O$ | 10 | 11 | 9 | 9 | 7 | 7 | 10 | 10 |
| | $Na_2O+Li_2O+K_2O$ | 10 | 11 | 14 | 14 | 13.8 | 14 | 16 | 16.8 |
| | $TiO_2$ | | | | | | | | |
| | $CeO_2$ | | | | | | | | |
| | $Fe_2O_3$ | | | | | | | | |
| | $SnO_2$ | | | | | | | | |
| | $Sb_2O_3$ | | | | | | | | |
| | $Gd_2O_3$ | 4 | 4 | 4 | 4 | 4.2 | 4 | 4 | 4 |
| | $Y_2O_3$ | | | | | | | | |
| | $La_2O_3$ | | | | | | | | |
| | $Yb_2O_3$ | | | | | | | | |
| | $Lu_2O_3$ | | | | | | | | |
| | $Er_2O_3$ | | | | | | | | |
| | | 100 | 100 | 100 | 100 | 100 | 100 | 100 | 100 |
| Solubility of glass, cystallinity, uniformity | | ○ | ○ | ○ | ○ | ○ | ○ | ○ | ○ |
| Coloring | | ○ | ○ | ○ | ○ | ○ | ○ | ○ | ○ |
| Coefficient of linear thermal expansion (30~380°C) × $10^{-7}$/°C | | 55.8 | 56.2 | 57.4 | 57.3 | 57.1 | 57.4 | 57.8 | 58.4 |
| Transmittance for 532nm (thickness:0.5mm) | | 90.4 | 90.7 | 90.4 | 90.3 | 90.6 | 90.4 | 90.2 | 90.2 |
| Transmittance for 313nm (thickness:0.5mm) | | 83.2 | 82.7 | 82.5 | 82.6 | 82.1 | 82.7 | 83 | 83.2 |
| Micro Vickers hardness(HV) | | 605 | 604 | 602 | 603 | 603 | 604 | 602 | 601 |
| Ratio of reduction in weight for testing for waterproofness(%) (90°C, 24hours) | | 0.8 | 1.2 | 0.8 | 1.2 | 0.9 | 1.1 | 0.8 | 0.9 |

FIG. 4

| | Sample No. | 25 | 26 | 27 | 28 | 29 | 30 | 31 | 32 |
|---|---|---|---|---|---|---|---|---|---|
| Glass composition (weight%) | $SiO_2$ | 64 | 66.5 | 62.5 | 61.5 | 66 | 64 | 63 | 68 |
| | $B_2O_3$ | 15 | 16 | 14 | 13 | 17 | 15 | 13 | 15.1 |
| | $Al_2O_3$ | 3.2 | 3 | 3 | 3 | 4 | 3 | 3 | 3.3 |
| | $Na_2O$ | 3.8 | 3 | 3 | 3 | 2 | 2 | 2 | 2 |
| | $Li_2O$ | 3 | 1.5 | 1.5 | 1.5 | 2.5 | 2.5 | 2.5 | 2.5 |
| | $K_2O$ | 7 | 4.5 | 4.5 | 4.5 | 4.5 | 4.5 | 4.5 | 4.5 |
| | $Na_2O+Li_2O+K_2O$ | 13.8 | 9 | 9 | 9 | 9 | 9 | 9 | 9 |
| | $TiO_2$ | 0.5 | 2 | 8 | 10 | 0 | 0 | 0 | 0.5 |
| | $CeO_2$ | | | | | 0.1 | 5 | 6 | 0.1 |
| | $Fe_2O_3$ | | | | | | | | |
| | $SnO_2$ | | | | | | | | |
| | $Sb_2O_3$ | | | | | | | | |
| | $Gd_2O_3$ | 3.5 | 3.5 | 3.5 | 3.5 | 3.9 | 4 | 4 | 4 |
| | $Y_2O_3$ | | | | | | | | |
| | $La_2O_3$ | | | | | | | | |
| | $Yb_2O_3$ | | | | | | | | |
| | $Lu_2O_3$ | | | | | | | | |
| | $Er_2O_3$ | | | | | | | | |
| | | 100 | 100 | 100 | 100 | 100 | 100 | 98 | 100 |
| Solubility of glass, cystallinity, uniformity | | ○ | ○ | ○ | × crystal deposit | ○ | ○ | ○ | ○ |
| Coloring | | ○ | ○ | ○ | ○ | ○ | ○ | yellow | ○ |
| Coefficient of linear thermal expansion $(30\sim380°C)\times 10^{-7}/°C$ | | 53.1 | 53 | 53.5 | 53.9 | 56 | 55.9 | 56.2 | 55.9 |
| Transmittance for 532nm (thickness:0.5mm) | | 90.6 | 90.4 | 90.3 | 40.2 | 90.3 | 90.3 | 90.5 | 90.1 |
| Transmittance for 313nm (thickness:0.5mm) | | 78.6 | 59.4 | 18.1 | 12.5 | 52.4 | 0.8 | 0.02 | 43.1 |
| Micro Vickers hardness(HV) | | 602 | 605 | 603 | 604 | 602 | 605 | 605 | 604 |
| Ratio of reduction in weight for testing for waterproofness(%) (90°C,24hours) | | 0.8 | 0.5 | 0.6 | 0.4 | 0.5 | 0.5 | 0.6 | 0.4 |

FIG. 5

| | Sample No. | 33 | 34 | 35 | 36 | 37 | 38 | 39 | 40 |
|---|---|---|---|---|---|---|---|---|---|
| Glass composition (weight%) | $SiO_2$ | 63 | 65 | 65 | 68 | 68 | 69 | 67 | 67 |
| | $B_2O_3$ | 11.5 | 12 | 12 | 15 | 14 | 15 | 18 | 18 |
| | $Al_2O_3$ | 3 | 3 | 2 | 3 | 3 | 3 | 3 | 3 |
| | $Na_2O$ | 3.8 | 3 | 3 | 3 | 3 | 3 | 3 | 3 |
| | $Li_2O$ | 2.4 | 1.5 | 1.5 | 1.5 | 1.5 | 1.5 | 1.5 | 1.5 |
| | $K_2O$ | 4.2 | 4.5 | 4.5 | 4.5 | 4.5 | 4.5 | 4.5 | 4.5 |
| | $Na_2O+Li_2O+K_2O$ | 10.4 | 9 | 9 | 9 | 9 | 9 | 9 | 9 |
| | $TiO_2$ | 8 | 1 | 1 | 0.55 | | | | |
| | $CeO_2$ | 0.1 | | | 0.4 | | | | |
| | $Fe_2O_3$ | | | | 0.05 | | | | |
| | $SnO_2$ | | | | | 2.5 | | | |
| | $Sb_2O_3$ | | | | | | 0.5 | | |
| | $Gd_2O_3$ | 4 | 10 | 11 | 4 | 3.5 | 3.5 | 3 | |
| | $Y_2O_3$ | | | | | | | | 3 |
| | $La_2O_3$ | | | | | | | | |
| | $Yb_2O_3$ | | | | | | | | |
| | $Lu_2O_3$ | | | | | | | | |
| | $Er_2O_3$ | | | | | | | | |
| | | 100 | 100 | 100 | 100 | 100 | 100 | 98 | 100 |
| Solubility of glass, cystallinity, uniformity | | ○ | ○ | × striae | ○ | ○ | ○ | ○ | ○ |
| Coloring | | ○ | ○ | ○ | ○ | ○ | ○ | ○ | ○ |
| Coefficient of linear thermal expansion $(30\sim380°C) \times 10^{-7}/°C$ | | 56.1 | 53.2 | 53.1 | 52.9 | 53 | 53.1 | 52.7 | 52.8 |
| Transmittance for 532nm (thickness:0.5mm) | | 90.3 | 90.4 | 86.4 | 90.4 | 90.2 | 90.7 | 90.1 | 90.6 |
| Transmittance for 313nm (thickness:0.5mm) | | 12.2 | 75.4 | 72 | 41.2 | 36 | 82.1 | 82.3 | 82.5 |
| Micro Vickers hardness(HV) | | 603 | 610 | 618 | 604 | 604 | 603 | 607 | 610 |
| Ratio of reduction in weight for testing for waterproofness(%) (90°C, 24hours) | | 0.5 | 0.5 | 0.6 | 0.4 | 0.5 | 0.5 | 0.4 | 0.5 |

FIG. 6

| Sample No. | | 41 | 43 | 44 | 45 | 46 |
|---|---|---|---|---|---|---|
| Glass composition (weight%) | $SiO_2$ | 67 | 67 | 67 | 67 | 68 |
| | $B_2O_3$ | 18 | 18 | 18 | 18 | 19 |
| | $Al_2O_3$ | 3 | 3 | 3 | 3 | 4 |
| | $Na_2O$ | 3 | 3 | 3 | 3 | 3 |
| | $Li_2O$ | 1.5 | 1.5 | 1.5 | 1.5 | 1.5 |
| | $K_2O$ | 4.5 | 4.5 | 4.5 | 4.5 | 4.5 |
| | $Na_2O+Li_2O+K_2O$ | 9 | 9 | 9 | 9 | 9 |
| | $TiO_2$ | | | | | |
| | $CeO_2$ | | | | | |
| | $Fe_2O_3$ | | | | | |
| | $SnO_2$ | | | | | |
| | $Sb_2O_3$ | | | | | |
| | $Gd_2O_3$ | | | | | |
| | $Y_2O_3$ | | | | | |
| | $La_2O_3$ | 3 | | | | |
| | $Yb_2O_3$ | | 3 | | | |
| | $Lu_2O_3$ | | | 3 | | |
| | $Er_2O_3$ | | | | 3 | |
| | | 100 | 100 | 100 | 100 | 100 |
| Solubility of glass, cystallinity, uniformity | | ○ | ○ | ○ | ○ | ○ |
| Coloring | | ○ | ○ | ○ | × faint red | ○ |
| Coefficient of linear thermal expansion $(30\sim380°C) \times 10^{-7}/°C$ | | 53 | 52.8 | 53.1 | 52.7 | 52.1 |
| Transmittance for 532nm (thickness:0.5mm) | | 90.4 | 90.3 | 90.1 | 90.3 | 90.5 |
| Transmittance for 313nm (thickness:0.5mm) | | 83.4 | 82.1 | 82.6 | 82.4 | 82.6 |
| Micro Vickers hardness(HV) | | 908 | 606 | 605 | 605 | 572 |
| Ratio of reduction in weight for testing for waterproofness(%) (90°C, 24hours) | | 0.6 | 0.4 | 0.5 | 0.4 | 0.2 |

FLUORESCENT LAMP MADE OF GLASS AND HAVING PARTICULAR COMPOSITION

The present application claims priority over Japanese Application JP 2008-115045 filed on Apr. 25, 2008, the contents of which are hereby incorporated into this application by reference.

BACKGROUND OF THE INVENTION (1) Field of the Invention

The present invention relates to a fluorescent lamp and, in particular, to a fluorescent lamp for use for a backlight source for display devices, such as liquid crystal displays, glass for fluorescent lamps which is appropriate for fluorescent lamps, and a glass tube using the same.

(2) Related Art Statement

Liquid crystal display devices widely used in televisions and monitors have a backlight made up of optical members, such as a light source provided on the rear or side of the liquid crystal display portion, a reflective sheet for making light emitted from the light source uniform, a light guide plate, a diffusion sheet and a prism sheet, and illuminate the liquid crystal display portion from the rear, so that images can be displayed on the liquid crystal display portion.

In addition, high image quality performance is required for liquid crystal devices in terms of high brightness, high resolution and high contrast, and furthermore, reduction in the thickness, weight and power consumption, as well as prolonging of the life, in addition to increased image quality, are also required, in terms of properties to be provided. Moreover, it is necessary to take safety and the environment into consideration.

Accordingly, it is necessary for the light source of liquid crystal display devices to have certain properties, in order for the liquid crystal display device to meet these requirements, and fluorescent lamps are generally used. Though there are various types of fluorescent lamps, cold cathode type fluorescent lamps (hereinafter referred to as cold cathode fluorescent lamps) are often used, for the reason that it is possible to make the tube thin, so that reduction in the thickness of the liquid crystal display device is easy, their life is long, and the required brightness can be secured, along with the elongation of the tube.

Cold cathode fluorescent lamps have a structure where electrodes are provided at the two ends of the glass tube, an inert gas, such as argon (Ar) or neon (Ne), and mercury are sealed in the tube with relatively low pressure, and a fluorescent body is applied on the inner wall of the tube, so that discharge between the electrodes generates ultraviolet rays and the fluorescent body is stimulated mainly by exciting lines of 254 nm and 185 nm and emits light, and thus, necessary visible light can be gained.

Currently, long cold cathode fluorescent lamps having an outer diameter of approximately 3 mm, a thickness of approximately 0.5 mm and a length of 500 mm or more are m use.

In addition, conventional electrodes are formed of portions in cup form made of a metal, such as nickel, tantalum or tungsten, and lead portions which penetrate through the glass tube and connected to the portions in cup form. In addition conventional leads are formed of Kovar (alloy of Fe, Ni and Co) or tungsten, and penetrate through the glass and are sealed by the glass in the end portions of the glass tube, so that the fluorescent lamp can be kept airtight.

It is important for the glass used for cold cathode fluorescent lamps to have physical strength, because the diameter of the tube is small, and the tube is relatively thin and long.

In addition, the temperature of the glass around the electrode portions becomes high during the operation of the fluorescent lamp, and therefore, it is necessary for the coefficient of thermal expansion of the leads and the coefficient of thermal expansion of the glass to be as close as possible, in order to maintain the heat resistance, and so that the sealed portions of the leads remain airtight.

In addition, ultraviolet rays are continuously generated as a result of the discharge inside the tube during operation, and therefore, it is important for the glass to be prevented from becoming colored due to solarization by the ultraviolet rays. Furthermore, optical members provided around the fluorescent lamp are usually made of plastic, and thus, the color changes in the optical members when ultraviolet rays leak from the fluorescent lamp. Therefore, it is necessary for the glass to be provided with such properties as to block ultraviolet rays, in order to reduce the amount of ultraviolet rays that leak from the fluorescent lamp.

Concretely, ultraviolet rays generated within fluorescent lamps include exciting lines of 313 nm, in addition to the above described 185 nm and 245 nm lines, and thus, it is effective for preventing the color of optical members made of plastic from changing to block 313 nm exciting lines, in addition to 185 nm and 254 nm exciting lines.

It is necessary for the glass of cold cathode fluorescent lamps used as a light source for liquid crystal display devices to have the above described properties, and the glass which usually contains $B_2O_3$ as a main component, in order to gain physical strength and excellent heat resistance, and has glass compositions where elements having such properties as to prevent solarization and block UV rays, such as $TiO_2$, $CeO_2$, $Fe_2O_3$, $Sb_2O_3$ and $Nb_2O_3$, are added alone, or two or more are added, as elements have been examined.

Japanese Unexamined Utility Model Publication H5 (1993)-8861 describes a fluorescent lamp having a glass tube containing 0.01% to 0.1% of iron oxide ($Fe_2O_3$) and 0.01% to 1.0% of titanium oxide ($TiO_2$) by weight, where the average coefficient of linear expansion α is preferably $80 \times 10^{-7}/°$ C. to $110 \times 10^{-7}/°$ C.

Japanese Patent No. 3575114 describes a glass tube using glass containing 55.0% to 73.0% of $SiO_2$, 10.0% to 21.7% of $B_2O_3$, 1.0% to 10.0% of $A_2O_3$, 0% to 4.0% of $Li_2O$, 0% to 3.2% of $Na_2O$, 2.6% to 15.0% of $K_2O$, 4.0% to 16.0% of $Li_2O+Na_2O+K_2O$, 0.05% to 9.0% of $TiO_2$, and 0% to 10.0% of PbO by weight, where the coefficient of linear expansion in a temperature range of 30° C. to 380° C. is $43 \times 10^{-7}/°$ C. to $55 \times 10^{-7}/°$ C.

Japanese Patent No. 3786397 describes a glass tube for a fluorescent lamp using glass containing substantially no PbO but containing 55% to 75% of $SiO_2$, 1% to 10% of $Al_2O_3$, 10% to 25% of $B_2O_3$, 0.01% to 3% of $ZrO_2$, 5% to 15% of $Li_2O+Na_2O+K_2O$ and 0.1% to 10% of at least two compounds from among $WO_3$, $Sb_2O_3$, $Nb_2O_5$, $Bi_2O_3$, $CeO_2$ and $Fe_2O_3$ by mass, where the average coefficient of linear expansion in a temperature range of 50° C. to the glass transition point (Tg) is $48 \times 10^{-7}/°$ C. to $58 \times 10^{-7}/°$ C.

In addition, Japanese Unexamined Patent Publication 2007-210851 describes a glass tube for a fluorescent lamp made of borosilicate based glass containing 55% to 75% of $SiO_2$, 1% to 7% of $Al_2O_3$, 10% to 25% of $B_2O_3$, 0.1% to 3% of $Li_2O$, 3% to 9.5% of $K_2O$, 0.1% to 5% of $CaO+MgO+BaO+SrO$, 0.01% to 5% of $Nb_2O_5+SnO_2+ZrO_2+ZnO$, 0.1% to 5% of $CeO_2+WO_3+V_2O_5$ and 0.001% to 0.05% of $Fe_2O_3$, where the average coefficient of linear expansion in a temperature range of 0° C. to 300° C. as defined in JIS-R-3102 is $36 \times 10^{-7}/°$ C. to $57 \times 10^{-7}/°$ C.

However, these gazettes do not describe any optimal amount for the added elements, nor any ratio for rare earth elements to be contained.

SUMMARY OF THE INVENTION

Problem to be Solved by the Invention

Fluorescent lamps for liquid crystal display devices are required to have excellent glass properties in terms of the physical and thermal strength, prevention of solarization and blocking of ultraviolet rays, as described above, as well as to have excellent the anti-scratching properties, from the point of view of the manufacture of glass tubes and fluorescent lamps.

The surface of glass tubes easily get scratched during the manufacturing process for glass tubes or fluorescent lamps, due to contact with physical parts or mishandling by the operator, and thus, it is necessary for the glass to have such properties as to be hard to scratch. These properties are particularly important because they relate directly to increased workability and productivity in the process for manufacturing glass tubes and fluorescent lamps.

Though the quality of the material for the glass for fluorescent lamps for liquid crystal display devices has been examined in order to improve the physical strength, heat resistance, prevent solarization and the properties of blocking ultraviolet rays, as described above, prevention of glass from being scratched has not sufficiently been examined.

General methods for preventing glass from being scratched include methods for coating the surface of the glass with a protective film made of organic or inorganic components, and chemical reinforcement methods according to which elements having a large atomic radius, such as potassium (K) diffuses from the surface of the glass so as to substitute Na elements, and thus there is compression stress in the vicinity of the surface of the glass.

However, these methods have a problem, such that the protective film coating the surface of the glass comes off during heat treatment in the manufacture of fluorescent lamps, and the equipment for a process in accordance with a chemical reinforcement method is massive, which is not practical, from the point of view of productivity.

An object of the present invention is to provide a fluorescent lamp for a liquid crystal display device which is excellent in terms of the physical strength, heat resistance, prevention of solarization and the properties for blocking ultraviolet rays, and has excellent properties in terms of preventing scratching, and in particular, to provide glass which is appropriate for fluorescent lamps and a glass tube using the same.

Means for Solving Problem

Typical means of the present invention are as follows. That is to say, the glass for fluorescent lamps according to the present invention contains:

55.0% to 75.0% of $SiO_2$;
10.0% to 25.0% of $B_2O_3$;
1.0% to 10.0% of $Al_2O_3$;
0% to 3.8% of $Na_2O$;
0% to 3.0% of $Li_2O$;
3.0% to 10.0% of $K_2O$;
3.2% to 16.0% of $Na_2O+Li_2O+K_2O$;
0.5% to 8% of $TiO_2$;
0.1% to 5% of $CeO_2$;
0.6% to 8.1% of $TiO_2+CeO_2$; and
0.5% to 10.0% of an oxide of at least one rare earth element selected from the group consisting of Gd, Y, La, Yb and Lu as calculated as the oxide $Ln_2O_3$ (Ln: rare earth element) by weight, and is characterized in that the coefficient of linear expansion in a temperature range of 30° C. to 380° C. is $34 \times 10^{-7}/°$ C. to $58 \times 10^{-7}/°$ C.

The glass for fluorescent lamps may contain the following, in addition to the above described components by weight:

0.001% to 0.05% of $Fe_2O_3$;
0% to 0.7% of $Sb_2O_3$; and
0.1% to 3.0% of $SnO_2$.

The cold cathode fluorescent lamp according to the present invention is characterized in that a glass tube made of the above described glass is used. Furthermore, the liquid crystal display panel according to the present invention is characterized in that a cold cathode fluorescent lamp is used as a backlight.

Effects of the Invention

The present invention can provide glass which is excellent in terms of the physical strength, heat resistance, prevention of solarization, and the properties for blocking ultraviolet rays when an appropriate amount of such elements as $B_2O_3$, $TiO_2$, $CeO_2$ and $Fe_2O_3$ is added. Furthermore, when a rare earth element, such as Gd or Yb, is added, the physical strength of the glass can further be increased.

Glass tubes using the glass for fluorescent lamps according to the present invention are excellent in terms of the physical strength, heat resistance, prevention of solarization, and the properties for blocking ultraviolet rays, and have excellent effects of preventing scratching during the process for manufacturing glass tubes and fluorescent lamps, and thus the workability and productivity are higher.

BRIEF DESCRIPTION OF THE DRAWINGS

FIG. 1 is a table showing the glass composition and properties of samples No. 1 to No. 8;

FIG. 2 is a table showing the glass composition and properties of samples No. 9 to No. 16;

FIG. 3 is a table showing the glass composition and properties of samples No. 17 to No. 24;

FIG. 4 is a table showing the glass composition and properties of samples No. 25 to No. 32;

FIG. 5 is a table showing the glass composition and properties of samples No. 33 to No. 40;

FIG. 6 is a table showing the glass composition and properties of samples No. 41 to No. 46;

DETAILED DESCRIPTION OF THE INVENTION

Figure 7:
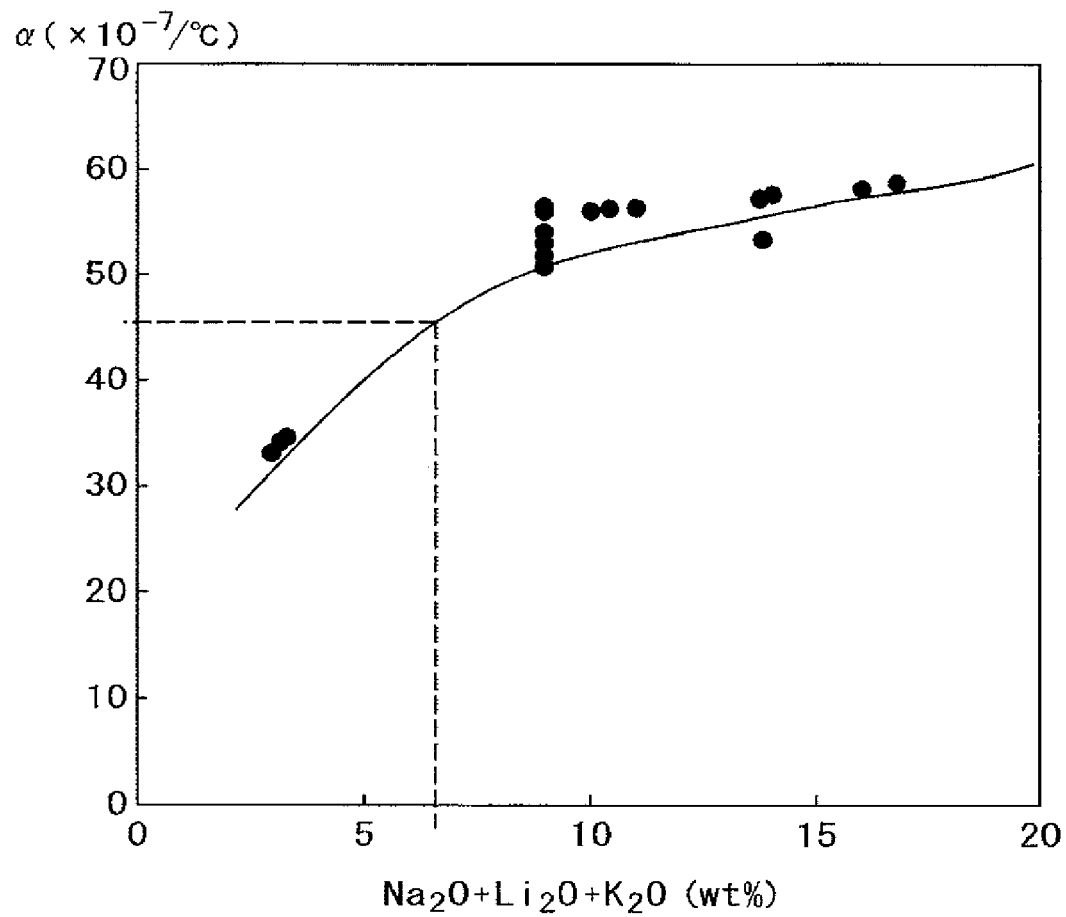
FIG. 7 is a graph showing the relationship between the alkali metal components and the coefficient of linear thermal expansion of glass.

In the following, the reasons why the composition of the glass for a fluorescent lamp according to the present invention is limited to the above are explained.

$SiO_2$ is a component forming a skeleton for glass, and 50% or more, preferably 60% or more, and 75.0% or less of the components is $SiO_2$. In the case of 55.0% or less, the chemical durability of the glass is low, and in the case of 75.0% or more, $SiO_2$ crystals are easily generated in the glass, making the solubility and moldability poor.

$B_2O_3$ is a component used to increase the weather resistance and solubility, and to adjust the viscosity, but when it exceeds 25.0%, it becomes difficult to gain uniform glass, due to the high volatility. In addition, in the case where $B_2O_3$ is less than 10%, the solubility is poor. Preferably, it is 12% to 20%.

$Al_2O_3$ has effects of improving the glass in terms of loss of clarity and the durability, but when it exceeds 10.0%, the solubility is poor and striae and the like are created. In the case where it is less than 1% the phase easily splits and the clarity tends to be low, and thus, it is preferably 2% to 8%.

Oxides of an alkali metal, such as $Na_2O$, $Li_2O$ or $K_2O$, are used to adjust the coefficient of expansion and viscosity and increase the solubility. However, the elements may cause the weather resistance of the glass to deteriorate, and therefore, it is necessary for the amount of the element in the composition to be in an appropriate range.

$Na_2O$ is a component which easily moves and reacts with mercury during the operation of the fluorescent lamp so as to form an amalgam, and reacts with fluorescent bodies so as to cause the brightness to lower. Accordingly, it is desirable for as little $Na_2O$ as possible to be included, and in the case where it is 3.8% or less, the properties are such that there are no problems in practical use. However, it is preferable for 0.1% or more to be contained, in order for the mixing in of alkali to be effective.

Though $Li_2O$ is a component used to increase the solubility and adjust the viscosity and the coefficient of expansion, the chemical durability is poor in the case where it exceeds 3%. However, it is preferable for 0.1% or more to be contained, in order for the mixing of alkali to be effective.

$K_2O$ is also a component used to increase the solubility and adjust the viscosity and the coefficient of thermal expansion, but no such effects are gained in the case of less than 3%, and the chemical durability is poor in the case where it exceeds 10%.

The total alkali metal content is 3.2% or more and 16% or less. In the case of less than 3.2%, vitrification is difficult and the coefficient of thermal expansion is too low for the coefficient of thermal expansion of the leads made of tungsten, for example. In the case of 16% or more, the weather resistance is poor.

$TiO_2$ is used to improve the prevention of solarization and gain properties for blocking ultraviolet rays, and effective properties can be gained in the case where 0.5% or more, preferably 2% or more, is used. In the case of 8% or more, crystals are easily created. In addition, in the case of 0.5% or less, there are effects in terms of the weather resistance of the glass improving, but it becomes difficult to gain good properties for blocking ultraviolet rays.

$CeO_2$ is also used to gain properties for blocking ultraviolet rays, but in the case of less than 0.1%, no such effects are gained, while in the case of 5% or more the glass becomes colored. The effective range is 0.1% to 5.0%. $CeO_2$ exists both in a trivalent and tetravalent state in glass, and colorless and transparent glass which is excellent in terms of the properties for blocking ultraviolet rays can be gained by increasing the ratio of trivalent $CeO_2$. Therefore, it is desirable to use a reducing atmosphere when melting glass.

In the case where there is both $CeO_2$ and $TiO_2$, the glass easily becomes colored yellow, and therefore, it is necessary to keep the amount of $CeO_2$ a low as possible, and in this case, it is desirable for it to be 0.1% or less, and it is practical for $TiO_2+CeO_2$ to be in a range from 0.6% to 8.1%.

Even a minuscule amount of $Fe_2O_3$ provides excellent properties for absorption of ultraviolet rays, and $Fe_2O_3$ is an impurity in glass materials, and therefore, strict management of the amount becomes necessary, even if it is a minuscule amount. In the case of 0.05% or more, the glass becomes significantly colored, while in the case of less than 0.001%, the effects of absorbing ultraviolet rays are less, and the glass material needs to be highly pure, which makes the cost for the glass material high, and therefore, a practical range for the content is 0.001% to 0.05%.

$SnO_2$ has the same effects as a clarificant, in addition to the effects of improving prevention of solarization. In the case where $SnO_2$ is 5% or more, crystals are easily created in the glass, while in the case of 0.1% or less, the effects are less. It is preferable for it to be in a practical range of 0.1% to 3%.

In addition, $SnO_2$ works as a reducing agent in the case where it is added in a bivalent compound, and works as an oxidizing agent in the case where it is added in a tetravalent compound. In the case where there are both $TiO_2$ and $CeO_2$, it is necessary to set an appropriate ratio for bivalent and tetravalent compounds. $Sb_2O_3$ is also used as a clarificant, but it is an environmentally destructive substance, though not potent, and thus, it is necessary to use as little as possible, and 0.7% or less is desirable.

In the present invention, microscopic particles are dispersed in the above described glass, and it is preferable for the microscopic particles to include rare earth elements, as described above. There is an upper limit (solution solubility) for the amount of rare earth elements that can be dissolved in structures with a skeleton forming glass tissue, so that a crystal phase or an amorphous phase deposit in the glass matrix when rare earth elements are added in an amount which exceeds the upper limit.

Particles having a crystal phase or an amorphous phase are referred to as microscopic particles. In the case where the distribution of rare earth elements is uneven, microscopic particles sometimes deposit, because the limit for the solid solution is exceeded in some portions, and thus, it is not necessary for the rare earth element content to exceed the limit for the solid solution in matrix glass. It is preferable for the rare earth elements to be both in the glass matrix and in the microscopic particles. In addition, it is preferable for the microscopic particles to be crystalline. Whether they are crystalline or not can be easily determined by observing an image of the skeleton in a transmission electron microscope photograph where stripes are visible in crystalline portions and no stripes are visible in vitreous (amorphous) portions.

When microscopic particles are dispersed in the glass matrix, the particles work to prevent the matrix from deforming and breaking down under stress, and therefore, the strength of the glass is high. In this case, the effects of increasing stress are strong when the particles are microscopic and dispersed uniformly.

In addition, in the first invention, it is preferable for the amount of the above described rare earth elements contained to be 0.1% to 10% as calculated as the oxide $Ln_2O_3$ (Ln is a rare earth element). In the case where the rare earth element content is less than 0.5%, the effects of increasing the physical strength are less. In the case where it exceeds 10%, the diameter of the microscopic particles is great, and as a result, there is a side effect, such that light reflection becomes more uneven. It is preferable for the rare earth element content in the glass for fluorescent lamps for liquid crystal display devices to be 10% or less.

In the first invention, it is preferable for at least one rare earth element selected from among Gd, Y, La, Yb and Lu to be used. Rare earth elements have a large ion radius, and therefore, easily deposit in the glass matrix as microscopic particles. The above described elements from among rare earth elements allow most microscopic particles to deposit uniformly in the glass matrix, and thus, the effects of increasing the strength are excellent.

Glass having the above described composition according to the present invention has sufficient physical and thermal strength as glass for fluorescent lamps, and the reasons why the coefficient of linear thermal expansion of glass in the present invention is set in a range of $34 \times 10^{-7}/°C.$ to $58 \times 10^{-7}/°C.$ are as follows. In the case where tungsten is used for the leads, the coefficient of expansion of the tungsten wires is $34 \times 10^{-7}/°C.$ to $46 \times 10^{-7}/°C.$, while in the case where Kovar is used, the coefficient of linear thermal expansion of the Kovar wires is $46 \times 10^{-7}/°C.$ to $58 \times 10^{-7}/°C.$, and the reliability of the leads sealed airtight lowers when the coefficient of linear thermal expansion is outside this range.

In addition, the present invention provides a glass tube formed of the above described glass in accordance with a Danner method or the like, and the glass tube has an outer diameter of 1.8 mm to 8.0 mm and a thickness of 0.2 mm to 0.6 mm, and is excellent in terms of the physical and thermal strength, prevention of solarization and the properties for blocking ultraviolet rays, and has such properties as to be difficult to scratch, and thus, is preferable for fluorescent lamps for liquid crystal display devices.

In the case where the outer diameter and thickness exceed the above described range, it cannot meet the requirements for reduction in the thickness and weight of liquid crystal display devices. In addition, in the case where they are less than the above described lower limit value, sufficient physical strength cannot be gained for practical use.

First Embodiment

Next, detailed examples where the glass composition of the glass for fluorescent lamps according to the present invention is examined are given. The tables in FIGS. 1 to 6 show the composition of the examined glass and the results of evaluation of the properties. FIGS. 1 to 6 show the properties for 46 samples. From among these samples, Nos. 2, 6, 8, 10, 11, 13, 14, 18, 20, 22, 24, 28, 31, 35, 45 and 46 are shown as comparative examples, and the rest are according to the present embodiment.

In the present invention, the solubility of the glass, the crystallinity, the uniformity, the color, the coefficient of linear thermal expansion, the transmittance, the micro Vickers hardness, and the ratio of reduction in weight after the test for waterproofness were evaluated as the properties of the glass for fluorescent lamps.

Glass was prepared in the following manner. A glass material powder having the composition shown in the tables in FIGS. 1 to 6 was weighed, put in a crucible made of platinum, and mixed, and after that heated to 1600° C. in an electrical furnace so as to melt. After sufficiently melting, stirring blades made of platinum were inserted into the melted glass, and the glass was stirred for approximately one hour. After that, the stirring blades were taken out and the melted glass was left still for 30 minutes, and after that poured into a jig made of graphite which was heated to approximately 300° C. and quenched, and thus, a glass block was gained. After that, the block was heated again to close to the glass transition temperature of the glass and gradually cooled at a cooling rate of 1° C./min to 2° C./min, so that warps were removed.

Concerning the solubility, crystallinity, uniformity and color of the glass, from among the evaluation items in the tables in FIGS. 1 to 6, prepared glass where a glass material remained, striae were observed, and crystals were found are marked with x, and a note is added. Glass having no problems in terms of the appearance as described above is marked with ○.

The coefficient of linear thermal expansion was measured using a differential thermal dilatometer (DL 9600, made by Shinku Riko Inc.). For measurement, the gained glass block was mechanically processed to pieces of 4 mm×4 mm×15 mm, and measurement was carried out at a rate of increase in temperature of 5° C./min using crystal as a reference sample. Using the thus gained thermal expansion curve, the coefficient of linear thermal expansion at 30° C. to 380° C. was calculated from the expansion of the sample at 30° C. and 380° C. An appropriate range for the coefficient of linear thermal expansion of tungsten wires is $34 \times 10^{-7}/°C.$ to $46 \times 10^{-7}/°C.$, and an appropriate range for the coefficient of linear thermal expansion of Kovar wires is $46 \times 10^{-7}/°C.$ to $58 \times 10^{-7}/°C.$, and therefore, the appropriate range for the samples was taken to be $34 \times 10^{-7}/°C.$ to $58 \times 10^{-7}/°C.$ The transmittance was measured using a spectrometer (U-4100, made by Hitachi Ltd.). The glass sample for measurement was gained by cutting out a glass plate from the glass block, and after that polishing the two sides to a mirror surface, so that the thickness of the sample was 0.5 mm. A tungsten lamp was used as the light source, and the reference was the air. Here, the transmittance is a value including loss during reflection from the surface of the glass. The tables in FIGS. 1 to 6 show the transmittance value for a wavelength of 532 nm and a wavelength of 313 nm. With respect to the wavelength of 532 nm, which is in a wavelength band in the visible light range, it is preferable for the transmittance to be 90% or higher, in order for brightness to be secured for the lamp. In addition, it is preferable for the transmittance for a wavelength of 313 nm to be 60% or less, in order for the glass to have effects of preventing solarization and blocking ultraviolet rays.

The micro Vickers hardness was measured using a micro Vickers hardness tester MKV-E, made by Akashi Seisakusho Co., Ltd. Ten points were measured with a load for measurement of 100 g, and the load was applied for 15 seconds, and after that, the average value was acquired. With respect to the micro Vickers hardness, 600 or higher is preferable, because there is no damage during the process for manufacturing a liquid crystal panel, transportation and use.

The waterproofness was evaluated by polishing the glass sample to a cube of 10 mm×10 mm×10 mm with a mirror surface, weighing the sample before testing with precision, and after that immersing the sample in hot water of 90° C. for 24 hours, taking out the sample and weighing it after testing, and thus, dividing the difference in weight by the weight before testing. With respect to the waterproofness, it is preferable for the ratio of reduction in weight to be less than 1.0%, because there is no corrosion even at high temperatures and high humidity, and the illuminance does not deteriorate.

Samples No. 1 to 24 and 37 to 46 in the tables in FIGS. 1 to 6 are glass containing no $TiO_2$ or $CeO_2$ and having effects of blocking ultraviolet rays, whereas samples No. 25 to 36 are glass having effects of blocking ultraviolet rays. In addition, samples No. 1 to 45 are glass containing an oxide of a rare earth element, and No. 46 is glass containing no oxide of a rare earth element.

As can be seen from the results of examination for the glass of samples No. 1 to 6, in glass No. 2 having an $SiO_2$ content of 54 weight %, the ratio of reduction in weight was 1.2% as found through the test for waterproofness, which is more than 1.0%, and thus the glass is not preferable. In glass No. 3 having an $SiO_2$ content of 55 weight %, the ratio of reduction of weight was 0.9% as found through testing for waterproofness, which is less than 1.0%. As is clear from the above, it is preferable for the $SiO_2$ content to be 55 weight % or more. In addition, the $SiO_2$ content in glass No. 6 was as high as 76 weight %, and there were striae, and the transmittance was low, whereas glass No. 5 having an $SiO_2$ content of 75 weight % was clear. Accordingly, it is preferable for the $SiO_2$ content to be 75 weight % or less. It is clear from the above that it is preferable for the $SiO_2$ content to be 55 weight % or more and 75 weight % or less.

As can be seen from the results of examination for the glass of samples No. 7 to 10, in glass No. 8 having a $B_2O_3$ content of 9 weight %, the fluidity of the glass was poor and uneven, and there were striae, whereas glass No. 7 having a $B_2O_3$ content of 10 weight % was clear. In addition, the sample No. 10 having a $B_2O_3$ content of 26 weight % was volatile, and thus, the gained glass block was uneven, which is not preferable, whereas glass No. 9 having a $B_2O_3$ content of 25 weight % was clear. It is clear from the above that it is preferable for the $B_2O_3$ content to be 10 weight % or more and 25 weight % or less.

As can be seen for samples No. 11 to 13, in No. 11 having an $Al_2O_3$ content of 0.5%, the micro Vickers hardness is lower than 600, and thus, the physical strength was not sufficient. Sample No. 5 has an $Al_2O_3$ content of more than 1.0%, and thus, the micro Vickers hardness is 608, which is a sufficiently high value. In addition, glass No. 13 has an $Al_2O_3$ content of as high as 11 weight %, and thus, the viscosity of the melted glass was high, and the glass was uneven and there were striae, and the transmittance was low. Glass No. 12 having an $Al_2O_3$ content of 10 weight % was clear. Accordingly, it is preferable for the $Al_2O_3$ content to be 1 weight % or more and 10 weight % or less.

As can be seen for samples No. 14 to 24, in glass No. 14 having a $K_2O$ content of 3 weight % and an $LiO_2+Na_2O+K_2O$ content of 3 weight %, the coefficient of linear thermal expansion is as low as $33.2 \times 10^{-7}/°C.$, which is not preferable. In glass No. 15 having a $K_2O$ content of 3.2 weight % and an $Li_2O+Na_2O+K_2O$ content of 3.2 weight % and in glass No. 16 having a $K_2O$ content of 3.0 weight % but an $LiO_2+Na_2O+K_2O$ content of 3.3 weight %, the coefficient of linear thermal expansion is $34.2 \times 10^{-7}/°C.$ to $34.5 \times 10^{-7}/°C.$, which is a preferable value.

In addition, in glass No. 18 having a $K_2O$ content of 11 weight %, the ratio of reduction in weight was as high as 1.2 as found through testing for waterproofness, which is not preferable. Likewise, in glass No. 20 having an $Li_2O$ content of 4 weight % and glass No. 22 having an $Na_2O$ content of 4 weight %, the ratio of reduction in weight was also high, which is not preferable. In glass No. 17 having a $K_2O$ content of 10 weight %, in glass No. 19 having an $Li_2O$ content of 3 weight %, and in glass No. 21 having an $Na_2O$ content of 3.8 weight %, the ratio of reduction in weight was less than 1.0% as found through testing for waterproofness, which is preferable.

In addition, in No. 24 having an $Li_2O+Na_2O+K_2O$ content of 16.8 weight %, the coefficient of linear thermal expansion was as high as $58.4 \times 10^{-7}/°C.$, which is not preferable. In No. 23 having an $Li_2O+Na_2O+K_2O$ content of 16.0 weight %, the coefficient of linear thermal expansion was $57.8 \times 10^{-7}/°C.$, which is a preferable value.

As can be seen from the above, it is preferable for the $K_2O$ content to be 3.0 weight % to 10.0 weight %, for the $Li_2O$ content to be 3.0 weight % or less, and for the $Na_2O$ content to be 3.8 weight %, as well as for the $Li_2O+Na_2O+K_2O$ content to be 3.2 weight % to 16.0 weight %.

As can be seen from samples No. 25 to 28, the transmittance for a wavelength of 313 nm is low when $TiO_2$ is contained, and thus, the effects of blocking ultraviolet rays are excellent. Sample No. 25 contains 0.5 weight % of $TiO_2$, and the transmittance for a wavelength of 313 nm is 78.6%, which is low in comparison with samples containing no $TiO_2$. As the $TiO_2$ content increases, so do the effects of blocking ultraviolet rays, and when $TiO_2$ is 2 weight %, the transmittance is 59.4%, which is less than 60%.

In No. 28 having a $TiO_2$ content of 10%, however, crystals deposited and the transparency was lost, and thus, the transmittance of light in a visible range was low, which is not preferable. Glass No. 27 having a $TiO_2$ content of 8.0% was clear. It is clear from the above that it is preferable for the $TiO_2$ content to be 0.5 weight % or more and 8.0 weight % or less. More preferably, it is 2.0 weight % or more and 8.0 weight % or less, as this makes for excellent effects of blocking ultraviolet rays.

Likewise, as shown in samples No. 29 to 31, excellent effects of blocking ultraviolet rays can be gained when $CeO_2$ is added, and as in sample 29, even with 0.1 weight % added, the effects are significant. Meanwhile, as in sample 31, when the $CeO_2$ content is 6.0 weight %, the sample is colored yellow, which is not preferable. In No. 30 having a $CeO_2$ content of 5.0 weight %, the transparency is excellent. It is clear from the above that it is preferable for the $CeO_2$ content to be 0.1 weight % or more and 6.0 weight % or less.

In addition, in the case where $TiO_2$ and $CeO_2$ are used together, the glass easily becomes colored yellow, and thus, it is necessary to use as little $CeO_2$ as possible. As in sample No. 33, the glass is not colored yellow when the $TiO_2+CeO_2$ content is 8.1%. Accordingly, it is desirable for the content to be 0.1% or less, and the glass is practical when the $TiO_2+CeO_2$ content is in a range from 0.6% to 8.1%.

In addition, as in samples No. 36 and 37, effects of absorbing ultraviolet rays can also be gained when an oxide, such as $Fe_2O_3$ or $SnO_2$, is used. $Fe_2O_3$ has such properties as to be highly absorbing of ultraviolet rays, even when contained in minuscule amounts, and is an impurity for glass materials, and therefore, the amount requires strict control, even when in minuscule amounts. When the content is 0.05% or higher, the coloring of the glass is significant, while when the content is less than 0.001%, the effects of absorbing ultraviolet rays are poor, and highly pure glass materials become necessary, making the cost for the glass material high, and therefore, a practical content is in a range of 0.001% to 0.05%.

$SnO_2$ has the same effects as clarificants, in addition to effects of preventing solarization. When $SnO_2$ is 5% or more, crystals are easily created in the glass, while when $SnO_2$ is 0.1% or less, the effects are less. A practical range is 0.1% to 3%.

In addition, $SnO_2$ works as a reducing agent in the case where it is added as a divalent compound, and works as an oxidizing agent in the case where added as a tetravalent compound. In the case where there is both $TiO_2$ and $CeO_2$, it is necessary to set an appropriate ratio for the divalent compound to the tetravalent compound.

Furthermore, as shown in sample No. 38, it is possible to use $Sb_2O_3$ as a clarificant. As it is an environmentally destructive substance, it is necessary to use as little as possible, and 0.7% or less is desirable.

Samples No. 1 to 45 contain Gd, Y, La, Yb, Er and Lu as oxides of a rare earth element, and when compared with sample No. 46, it is clear that the micro Vickers hardness is greater by approximately 30. This is because microscopic particles deposit when an oxide of a rare earth element is added, and thus, the physical strength is higher.

Though all of the above described oxides of a rare earth element provide excellent effects in terms of increasing the physical strength, high transparency is required in the case when used as glass for fluorescent lamps. For example, the glass containing $Er_2O_3$ of sample no. 45 is colored faint red, and therefore, it is not preferable for the light source. In addition, other oxides of a rare earth metal are also colored, though this is not described in the embodiments, and thus not preferable.

In addition, as in sample No. 35, in the case where $Gd_2O_3$ is used as an oxide of a rare earth element and the content is 11 weight %, the viscosity of the melted glass is high, the gained glass is not uniform, and there are striae. As a result, the transmittance for visible light is less than 90%, which is not preferable. In addition, sample 46, to which no oxide of a rare earth element is added, and, though not shown in the tables in FIGS. 1 to 6, samples having a $Gd_2O_3$ content of less than 0.5 weight % have a low degree of increase in the physical strength, which is not preferable. Though sample No. 34 contains 10 weight % of $Gd_2O_3$, clear glass could be gained. It is clear from the above that it is preferable for 0.5 weight % to 10.0 weight % of at least one oxide of a rare earth element selected from the group consisting of Gd, Y, La, Yb and Lu to be contained as calculated as the oxide $Ln_2O_3$ (Ln: rare earth element).

From among the properties described above, the coefficient of thermal expansion of the glass is important for the reliability in the sealing portion of the leads in the cold cathode fluorescent lamp. The coefficient of thermal expansion of the glass can be adjusted by adjusting the alkali metal content. Concretely, the coefficient of thermal expansion can be adjusted by adjusting the total content of $Na_2O+Li_2O+K_2O$.

Kovar or tungsten can be used as the material for the leads in the fluorescent lamp. The coefficient of linear thermal expansion of tungsten wires is $34\times10^{-7}/°C.$ to $46\times10^{-7}/°C.$, while the coefficient of linear thermal expansion of Kovar wires is $46\times10^{-7}/$ to $58\times10^{-7}/°C$. The samples in FIGS. 1 to 6, excluding No. 14, 15, 16 and 24, have such a coefficient of linear thermal expansion as to allow a Kovar wire to be used. When the total content of $Na_2O+Li_2O+K_2O$ is 6.0% to 16.0%, the coefficient of linear expansion of the glass can be made $46\times10^{-7}/°C.$ to $58\times10^{-7}/°C.$, which is the same as for Kovar wires.

Meanwhile, in the case where tungsten is used for the leads, it is necessary for the coefficient of linear thermal expansion of glass to be $34\times10^{-7}/°C.$ to $46\times10^{-7}/°C.$ A total content for $Na_2O+Li_2O+K_2O$ which satisfies the requirements for coefficient of linear thermal expansion is 3.2% to 6.0%. Samples No. 15 and 16 from among the samples in FIGS. 1 to 6 satisfy these requirements. Sample No. 14 has a slightly lower coefficient of thermal expansion, and thus, it is inappropriate to use tungsten for the leads.

FIG. 7 shows the relationship between the total content of $Na_2O+Li_2O+K_2O$ and the coefficient of linear thermal expansion in the glass. In FIG. 7, the lateral axis is the total content of $Na_2O+Li_2O+K_2O$ and the longitudinal axis is the coefficient of linear thermal expansion. In order for the coefficient of linear thermal expansion to be $46\times10^{-7}/°C.$ or less as in FIG. 7, it is necessary for the total content of $Na_2O+Li_2O+K_2O$ to be 6% or less, and in order for the coefficient of linear thermal expansion to be $34\times10^{-7}/°C.$ or more, it is necessary for the total content of $Na_2O+Li_2O+K_2O$ to be 3.2% or more. The lower the total content of $Na_2O+Li_2O+K_2O$ is, the more dramatically the coefficient of linear thermal expansion becomes. Accordingly, it is necessary to strictly control the lower limit for the total content of $Na_2O+Li_2O+K_2O$.

Second Embodiment

Figure 8:
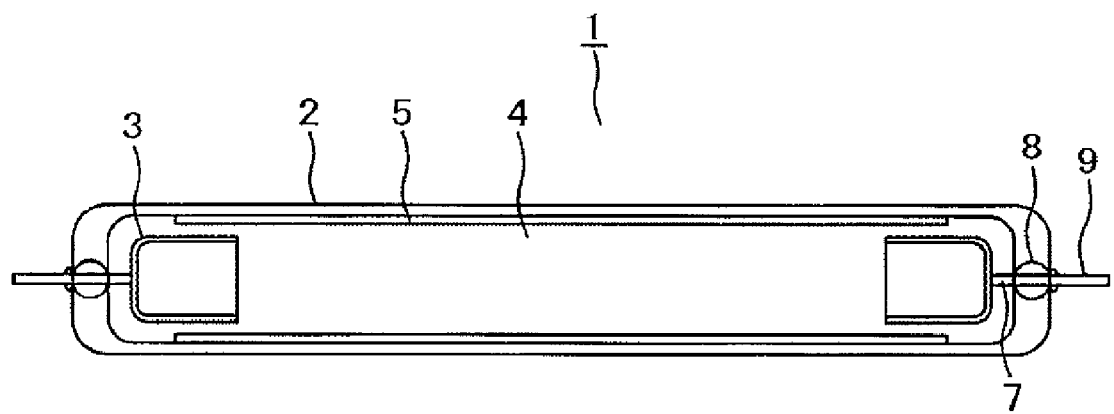
FIG. 8 is a cross sectional diagram showing a fluorescent lamp.

FIG. 8 is a schematic cross sectional diagram showing the configuration of the fluorescent lamp 1 according to the present invention.

The fluorescent lamp 1 is provided with a pair of electrodes 3 in cup form which face each other at the two ends inside a glass tube 2 made of a light transmitting insulating material, and openings at the two ends of the facing electrodes 3 in cup form face the main discharge region. Furthermore, a neon-argon (Ne—Ar) gas and mercury are sealed in the glass tube 2 as an inert gas 4 after making the inside of the glass tube 2 a vacuum, and thus, a fluorescent lamp is formed. A fluorescent body film 5 is deposited on the inner wall surface of the glass tube 2. In addition, the pair of electrodes 3 in cup form can be formed of a material having tungsten (W) as a main component, for example.

Figure 9A:
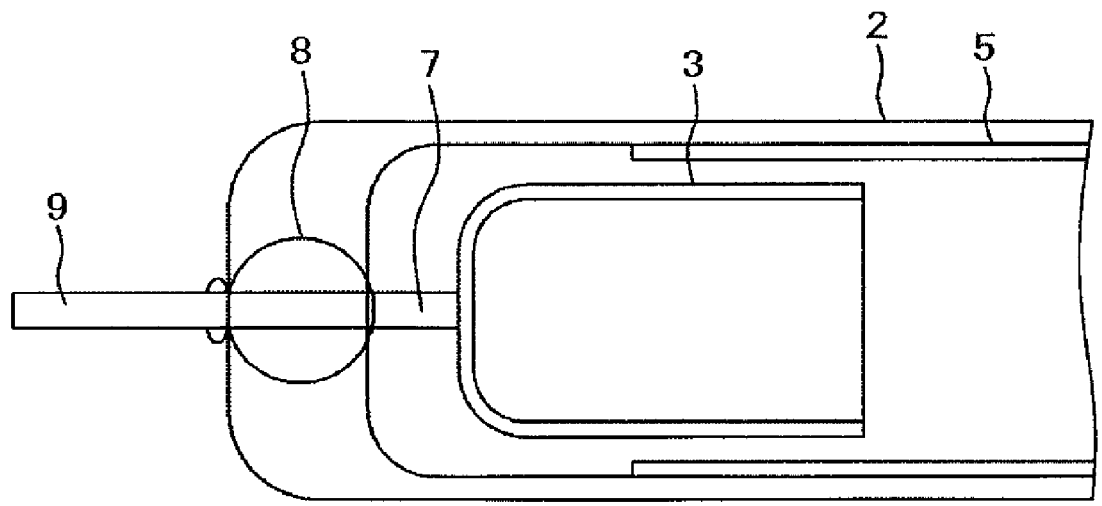
FIG. 9 is a diagram showing a fluorescent lamp in detail.
Figure 9B:
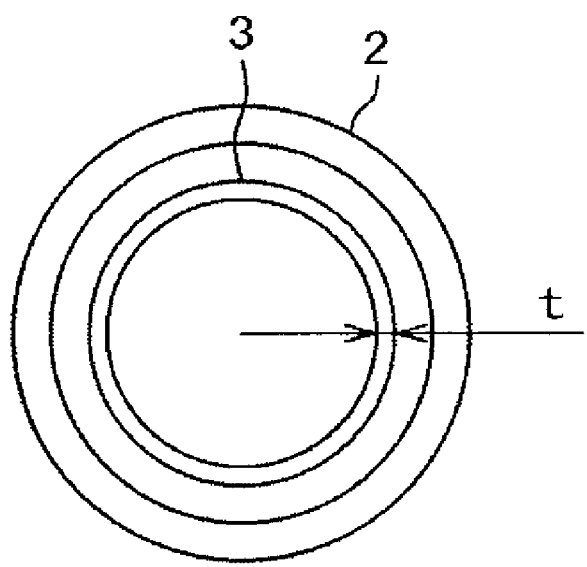

Next, the electrodes 3 in cup form are described in detail in reference to FIGS. 9A and 9B. FIG. 9A is a schematic, longitudinal cross sectional diagram of the glass tube, and FIG. 9B is a schematic, lateral cross sectional diagram.

The openings at the ends of the electrodes 3 in cup form face the main discharge region, and inner leads 7 made of Kovar having a coefficient of thermal expansion close to that of glass are connected in the rear end portions of the electrodes through welded portions where the materials are joined and electrically connected in accordance with a resistance welding method, an arc welding method or a laser welding method, for example.

Here, the fluorescent lamp 1 can be formed of a glass tube 2 having a thickness of approximately 200 μm to 600 μm, an outer diameter of approximately 1.8 mm to 8.0 mm and a length of approximately 50 mm to 1500 mm, for example.

In addition, it is desirable for the electrodes 3 in cup form to have a thickness t of approximately 0.15 mm when the outer diameter is 1.7 mm. The thinner the thickness t of the electrodes 3 in cup form is, the larger the inner area of the electrodes 3 in cup form becomes, and in addition, the smaller the amount of material becomes.

In addition, the inner leads 7 are supported by glass beads 8 and sealed between the inside and the outside of the glass tube 2 in an airtight state. The glass beads 8 are fused with and seal the glass tube 2 at the two end portions. The inner leads 7 protruding outward from the glass beads 8 are connected and joined to outer leads 9 made of a nickel material, for example, through welded portions. These outer leads 9 are connected to a power supply circuit, not shown, (generally an inverter circuit for turning on the light) so that the power for turning on the light is supplied across the facing electrodes 3 in cup form.

In the present embodiment, the fluorescent lamp is made of the glass described in the first embodiment. In the present embodiment, the total content of $Na_2O+Li_2O+K_2O$ is 6.0% to 16.0%, which matches the coefficient of thermal expansion of Kovar. In the present embodiment, glass where the total content of $Na_2O+Li_2O+K_2O$ is adjusted to 3.2% to 6.0% is used when tungsten is used for the inner leads.

The glass described in the first embodiment is used for the fluorescent lamp in the present embodiment, and therefore, the used fluorescent lamp is such that the transmittance for visible light is high, the transmittance for ultraviolet rays is low, and there are few defects in the glass. At the same time, an appropriate thermal expansion can be set for the glass, and therefore, the reliability with which the leads can be sealed is high. Furthermore, the surface of the glass is very hard, so that the glass can be prevented from being scratched, and thus, a highly reliable fluorescent lamp can be implemented.

Third Embodiment

Figure 10:
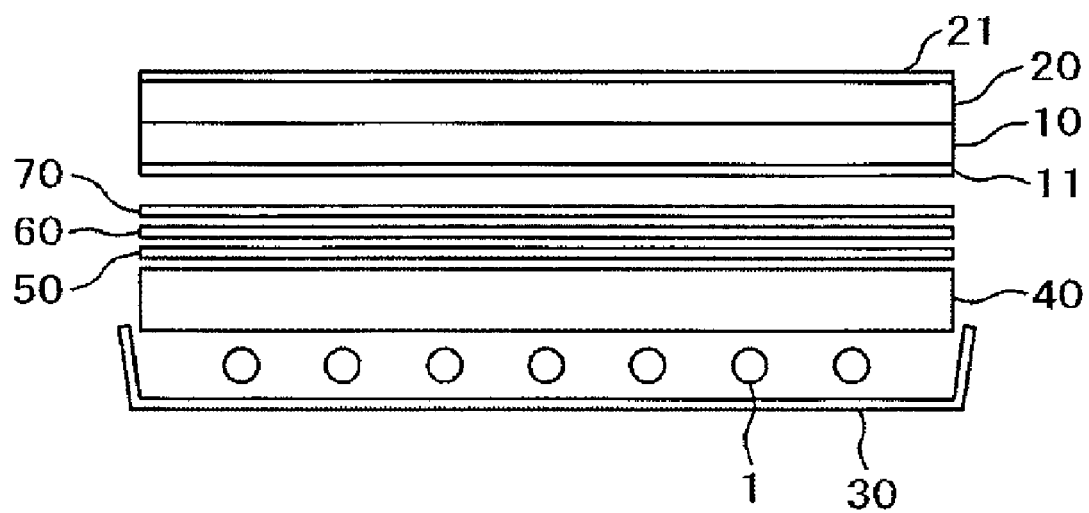
FIG. 10 is an exploded cross sectional diagram showing a liquid crystal display device.

FIG. 10 is an exploded cross sectional diagram showing a liquid crystal display device using a fluorescent lamp 1 where the glass described in the first embodiment is used. FIG. 10 shows a liquid crystal display device used in relatively large scale display devices, such as TVs. It is necessary for TVs to have a highly bright screen, and therefore, liquid crystal display devices having a so-called directly-behind-the-screen type backlight are used, so that the number of light sources is great.

In FIG. 10, the liquid crystal display device is separated into a liquid crystal display panel and a backlight. The liquid crystal display panel has a structure where a liquid crystal layer is sandwiched between a TFT substrate 10 on which thin film transistors (TFTs), pixel electrodes, scan lines, video signal lines and the like are formed, and a facing substrate 20 on which color filters are formed. In addition, a lower polarizing plate 11 adheres to the bottom of the TFT substrate 10, and an upper polarizing plate 21 adheres to the top of the facing substrate 20.

In the backlight, a number of fluorescent lamps 1 are used as a light source. The cold cathode fluorescent lamps 1 described in the second embodiment are used as the fluorescent lamps 1. A reflective plate 30 which also works as a lower frame is provided on the lower side of the backlight, so that light directed toward the bottom from the fluorescent lamps 1 is reflected toward the liquid crystal display panel side. A diffusion plate 40 is provided above the fluorescent lamps 1. A number of fluorescent lamps 1 are provided, and the brightness is high in portions directly above the fluorescent lamps 1, while the brightness is low in portions between the fluorescent lamps 1, and therefore, light is uneven as viewed from the liquid crystal display panel side. The diffusion plate 40 is used in order to make light directed toward the liquid crystal display panel from the fluorescent lamps 1 uniform.

A first diffusion sheet 50, a second diffusion sheet 60 and a third diffusion sheet 70 are provided above the diffusion plate 40. The diffusion sheets also work to make light emitted from the diffusion plate 40 uniform. There is some unevenness on the surface of the diffusion sheets, and this unevenness diffuses light from the light source, so that uniform light can be gained. A number of diffusion sheets are used, so that excellent effects of diffusing light can be gained. In addition, the unevenness on the surface of the diffusion sheets also works as a sort of prism, so as to provide effects of directing light toward the liquid crystal display panel as a whole. A liquid crystal display panel is provided above the above described backlight with a slight space in between.

The fluorescent lamps 1 in the present embodiment used for the backlight are the same as the fluorescent lamp 1 described in the second embodiment. Accordingly, the present fluorescent lamps 1 have high transmittance for visible light, low transmittance for ultraviolet rays, and few defects in the glass, and therefore, the image quality and the brightness of the image on the liquid crystal display device can be increased. In addition, the fluorescent lamps 1 in the present embodiment are excellent for preventing solarization, and therefore, there is little fluctuation in the spectrum for light from the backlight during long-term operation, and thus, an image quality close to the initial quality can be maintained for a long period of time. Furthermore, the physical strength of the fluorescent lamps 1 is high, and the reliability in the portion for sealing the leads is high, and therefore, the yield in the manufacture of liquid crystal display devices can be increased, and the reliability of the liquid crystal display device can also be increased.

Here, though FIG. 10 shows a directly-behind-the-screen type liquid display device, the fluorescent lamps 1 according to the present invention may be used for so-called sidelight type liquid crystal display devices where a light guide plate is used instead of the diffusion plate in FIG. 10, and the fluorescent lamps 1 are arranged on the sides of the light guide plate. In this structure, a prism sheet is in some cases used in order to increase the efficiency with which light from the light source can be used. Sidelight type liquid crystal display devices are used for thin display devices, such as those for laptop computers. The present invention can, of course, be applied to sidelight liquid crystal display devices.

What is claimed is:

1. A fluorescent lamp made of glass, comprising:
   55.0-75.0 weight % of $SiO_2$;
   10.0-25.0 weight % of $B_2O_3$;
   1.0-10.0 weight % of $Al_2O_3$;
   0-3.8 weight % of $Na_2O$;
   0-3.0 weight % of $Li_2O$;
   3.0-10.0 weight % of $K_2O$;
   3.2-16.0 weight % of $Na_2O+Li_2O+K_2O$;
   0.5-8.0 weight % of $TiO_2$;
   0.1-5.0 weight % of $CeO_2$;
   0.6-8.1 weight % of $TiO_2+CeO_2$; and
   0.5-10.0% of an oxide of at least one rare earth element selected from the group consisting of Gd, Y, La, Yb and Lu as calculated as an oxide $Ln_2O_3$ (Ln: rare earth element), wherein
   the coefficient of linear expansion of the glass in a temperature range of 30-380° C. is $34 \times 10^{-7}$/° C. to $58 \times 10^{-7}$/° C.

2. The fluorescent lamp according to claim 1, further comprising:
   0.001-0.05 weight % of $Fe_2O_3$;
   0-0.7 weight % of $Sb_2O_3$; and
   0.1-3.0 weight % of $SnO_2$.

3. The fluorescent lamp according to claim 1, wherein microscopic particles are dispersed in the glass, and the microscopic particles include said rare earth element.

4. The fluorescent lamp according to claim 1, further comprising:
   0.5-10.0% of Gd as a rare earth element as calculated as an oxide $Gd_2O_3$.

5. The fluorescent lamp according to claim 1, wherein the glass is in tube form.

6. The fluorescent lamp according to claim 1, wherein the glass is in tube form with an outer diameter of 1.8-8.0 mm and a thickness of 0.2-0.6 mm.

7. A fluorescent lamp made of glass, comprising:
   55.0-75.0 weight % of $SiO_2$;
   10.0-25.0 weight % of $B_2O_3$;
   1.0-10.0 weight % of $Al_2O_3$;
   0-3.8 weight % of $Na_2O$;
   0-3.0 weight % of $Li_2O$;
   3.0-10.0 weight % of $K_2O$;
   6.0-16.0 weight % of $Na_2O+Li_2O+K_2O$;
   0.5-8.0 weight % of $TiO_2$;
   0.1-5.0 weight % of $CeO_2$;
   0.6-8.1 weight % of $TiO_2+CeO_2$; and
   0.5-10.0% of an oxide of at least one rare earth element selected from the group consisting of Gd, Y, La, Yb and Lu as calculated as an oxide $Ln_2O_3$ (Ln: rare earth element), wherein the coefficient of linear expansion of the glass in a temperature range of 30-380° C. is 46×10⁻⁷/° C. to 58×10⁻⁷/° C.

8. The fluorescent lamp according to claim 7, further comprising:
   0.001-0.05 weight % of $Fe_2O_3$;
   0-0.7 weight % of $Sb_2O_3$; and
   0.1-3.0 weight % of $SnO_2$.

9. The fluorescent lamp according to claim 7, wherein microscopic particles are dispersed in the glass, and the microscopic particles include said rare earth element.

10. The fluorescent lamp according to claim 7, further comprising:
    0.5-10.0% of Gd as a rare earth element as calculated as an oxide $Gd_2O_3$.

11. The fluorescent lamp according to claim 7, wherein the glass is in tube form.

12. The fluorescent lamp according to claim 7, wherein the glass is in tube form with an outer diameter of 1.8-8.0 mm and a thickness of 0.2-0.6 mm.

13. A fluorescent lamp made of glass, comprising:
    55.0-75.0 weight % of $SiO_2$;
    10.0-25.0 weight % of $B_2O_3$;
    1.0-10.0 weight % of $Al_2O_3$;
    0-3.8 weight % of $Na_2O$;
    0-3.0 weight % of $Li_2O$;
    3.0-10.0 weight % of $K_2O$;
    3.2-6.0 weight % of $Na_2O+Li_2O+K_2O$;
    0.5-8 weight % of $TiO_2$;
    0.1-5 weight % of $CeO_2$;
    0.6-8.1 weight % of $TiO_2+CeO_2$; and
    0.5-10.0% of an oxide of at least one rare earth element selected from the group consisting of Gd, Y, La, Yb and Lu as calculated as an oxide $Ln_2O_3$ (Ln: rare earth element), wherein
    the coefficient of linear expansion of the glass in a temperature range of 30-380° C. is 34×10⁻⁷/° C. to 46×10⁻⁷/° C.

14. The fluorescent lamp according to claim 13, further comprising:
    0.001-0.05 weight % of $Fe_2O_3$;
    0-0.7 weight % of $Sb_2O_3$; and
    0.1-3.0 weight % of $SnO_2$.

15. The fluorescent lamp according to claim 13, wherein microscopic particles are dispersed in the glass, and the microscopic particles include said rare earth element.

16. The fluorescent lamp according to claim 13, further comprising:
    0.5-10.0% of Gd as a rare earth element as calculated as an oxide $Gd_2O_3$.

17. The fluorescent lamp according to claim 13, wherein the glass is in tube form.

18. The fluorescent lamp according to claim 13, wherein the glass is in tube form with an outer diameter of 1.8-8.0 mm and a thickness of 0.2-0.6 mm.

* * * * *